United States Patent [19]
Clark

[11] 4,022,643
[45] May 10, 1977

[54] METHODS OF MANUFACTURING EMBOSSED RESINOUS PRODUCTS

[75] Inventor: James R. Clark, Edison, N.J.

[73] Assignee: Congoleum Corporation, Milwaukee, Wis.

[22] Filed: Dec. 24, 1975

[21] Appl. No.: 644,371

[52] U.S. Cl. .................. 156/78; 156/209; 156/219; 156/246; 156/277; 156/289; 156/384; 264/210 R; 264/284; 264/321; 428/159; 428/315

[51] Int. Cl.² .......................................... B32B 5/18

[58] Field of Search .......... 156/78, 79, 209, 277, 156/246, 289, 199, 219, 387, 384, 459, 580; 264/210, 216, 284, 321; 428/315, 159

[56] References Cited

UNITED STATES PATENTS

| | | | |
|---|---|---|---|
| 3,293,094 | 12/1966 | Nairn et al. | 156/79 |
| 3,518,153 | 6/1970 | Slosberg et al. | 156/219 |
| 3,887,678 | 6/1975 | Lewicki | 264/321 |
| 3,932,245 | 1/1976 | Erb et al. | 264/321 |
| 3,959,434 | 5/1976 | Squier | 428/315 |

Primary Examiner—Edward G. Whitby
Attorney, Agent, or Firm—Richard T. Laughlin

[57] ABSTRACT

A method of manufacturing an embossed resinous product having a textured surface which comprises: forming a potentially foamable resinous composition containing a blowing agent therein; heating the potentially foamable resinous composition to an elevated temperature to activate the blowing agent to cause blowing of the potentially foamable resinous composition; and then, before the freshly blown resinous composition has cooled to ambient or room temperature and while it is still relatively soft, mechanically embossing the freshly blown resinous composition under pressure by applying to its surface a previously blown, chemically embossed resinous product having a suitably textured surface; and cooling the freshly blown and now embossed resinous composition to yield an embossed resinous product.

11 Claims, 1 Drawing Figure

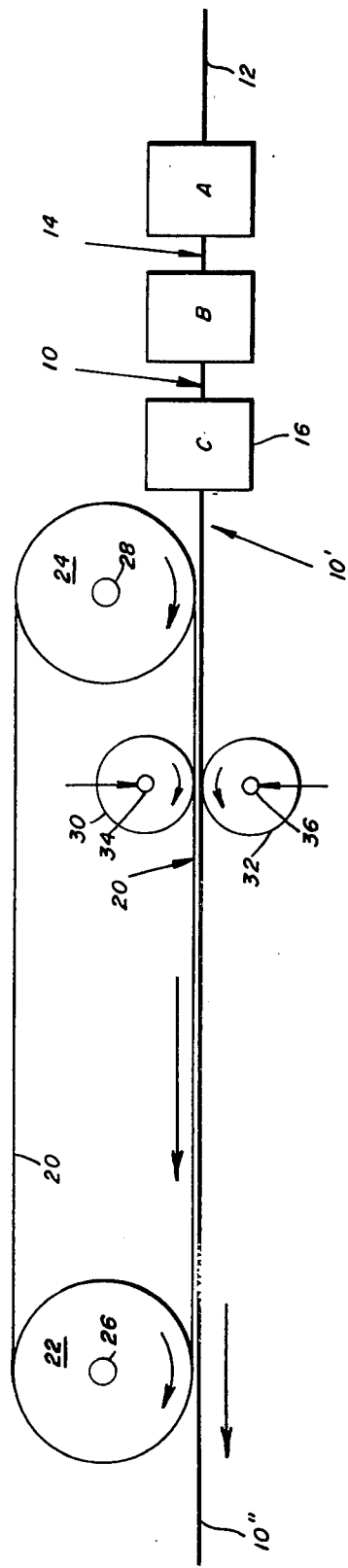

METHODS OF MANUFACTURING EMBOSSED RESINOUS PRODUCTS

THE FIELD OF THE PRESENT INVENTION

The present invention relates to improved methods of manufacturing embossed resinous products having a decorative, textured surface and, more particularly, to improved methods of manufacturing such embossed resinous products suitable for use as: floor and wall coverings; desk, table and counter tops; coated fabrics and like articles; etc.

THE GENERAL BACKGROUND OF THE PRESENT INVENTION

Methods of manufacturing embossed resinous products having decorative, textured surfaces have been known for many years.

Mechanical embossing is one of the earlier known techniques for making such embossed resinous products and has been employed for a very long period of time. These mechanical embossing techniques have required the use of suitable engraved or etched plates or rolls which were pressed against and into the resinous products under relatively great pressure to obtain the desired embossed decorative or textured surface. Unfortunately, the engraved or etched plates or rolls are very expensive to manufacture and it has long been desired to obviate the necessity of their use.

Chemical embossing, such as noted in U.S. Pat. Nos. 3,293,094 and 3,293,108, is a more recent development and has provided embossing techniques which do not require the use of expensive engraved or etched plates or rolls. For this reason, and other reasons which will become clear from a further reading of this specification, the use of chemical embossing techniques has grown tremendously in popularity and use in recent years.

Nevertheless, even the desirable features and advantages of such chemical embossing techniques can always be bettered and improved upon, in order to obtain better products with sharper and more distinct embossed or textured effects, at lesser expense, and with more universal application to a wider range of varied materials.

THE PURPOSES AND OBJECTS OF THE PRESENT INVENTION

It is therefore a principal purpose and object of the present invention to provide improved methods of manufacturing embossed resinous products having decorative or textured surfaces wherein the embossing is sharper and more distinct, and wherein the improved methods of manufacture can be carried out at lesser expense, particularly in that costly engraved or etched plates or rolls are not required, and wherein such improved methods of manufacture possess greater applicability to more varied resinous products. Other purposes and objects of the present invention will become clear from a further reading of this specification.

BASIC SUMMARY OF THE PRESENT INVENTION

It has been found that such principal purpose and object, as well as other principal purposes and objects is accomplished by an improved method of manufacturing an embossed resinous product having a decorative or textured surface which comprises: forming a potentially foamable, resinous composition containing a blowing agent therein; heating the potentially foamable, resinous composition to an elevated temperature for a sufficient period of time to activate or to decompose the blowing agent to cause blowing, foaming or expanding of the potentially foamable, resinous composition; and then, before the freshly blown resinous composition has cooled to ambient or room temperature and while it is still relatively soft, plastic and moldable, mechanically embossing the freshly blown resinous composition under pressure by applying to its surface a previously blown, chemically embossed resinous product having a suitably decorative or textured surface; and cooling the freshly blown and now embossed resinous composition to yield an embossed product having a decorative or textured surface.

BRIEF DESCRIPTION OF THE DRAWING

The present invention will be more fully understood from the description which follows, taken in conjunction with the accompanying self-explanatory drawing in which there is illustrated a preferred design of apparatus, mode of operation, and product embodying the present invention. It is to be understood, however, that the present invention is not to be considered limited to the constructions and forms described and illustrated, except as determined by the scope of the appended claims.

In the drawing:

The FIGURE is a fragmentary, schematic and diagrammatic showing, partially as a box-type flow-chart and partially as an elevation view, of a preferred form of apparatus and method for carrying out the principles of the present invention.

DESCRIPTION OF THE PREFERRED EMBODIMENT

In the FIGURE, there is shown at the right hand end thereof, a simplified diagrammatic flow chart in box-type form representing a typical manufacture of a blown resinous product having an embossed surface created by chemical embossing techniques such as described and illustrated in great particularity in U.S. Pat. Nos. 3,293,094 and 3,293,108 which issued on Dec. 20, 1966. As set forth therein, the resinous product normally comprises a backing sheet material, a blown or foamed plastisol composition, a printing ink composition, and a wear layer or top clear coating.

THE BACKING SHEET MATERIAL

An unblown resinous product 10 is shown in the FIGURE and comprises a backing sheet material 12, the specific chemical and physical nature of which does not relate to the essence of the present invention. It will suffice to say that the backing sheet material 12 is a matted or felted fibrous sheet, a woven fabric, a non-woven fabric, a knitted fabric, paper or a paper product, or substantially any type of sheet material. It may be formed of mineral fibers, natural fibers of wool, silk, cotton or other cellulosic origin, synthetic or manmade staple fibers or continuous filaments such as rayon, nylon, polyesters, polyolefins, acrylics, etc., asbestos, glass wool, mineral or slag wool, metallic threads, etc. The thickness of the backing sheet material is in the range of from about 0.015 inch to about 0.150 inch, or even greater, if so desired or required.

THE PLASTISOL COMPOSITION

A standard or conventional resinous composition 14, preferably a fluid or semi-fluid plastisol composition, rather than an organosol or an aqueous latex, is substantially uniformly deposited in a relatively thin substantially uniform layer on the surface of the backing sheet material 12. The thickness of the layer of plastisol composition 14, as applied and still wet and prior to blowing, foaming or expanding, is in the range of from about 0.003 inch to about 0.030 inch, or greater, if so desired or required. This deposition takes place in zone A.

The specific chemical and physical nature of the particular plastisol composition does not relate to the essence of the present invention but, preferably, it is a thermoplastic polymer or homopolymer of polyvinyl chloride, or a copolymer, block polymer, or graft polymer of polyvinyl chloride and one or more other copolymerizable resins such as vinyl acetate, vinyl propionate, vinyl butyrate, vinylidene chloride, alkyl acrylates and methacrylates, etc. Other thermoplastic resins, such as polyamides, polyesters, polyolefins, polystyrene, polycarbonates, acrylics, etc., are also of applicability within the broader aspects of the present invention.

Thermosetting resins are also of applicability within the principles of the present invention, provided they are still in the initial or intermediate condensation or polymerization stage, or have not been converted to a final stage wherein they are no longer soft, fusible, plastic, or moldable. Typical examples of thermosetting resins applicable to the present invention are: phenol-formaldehyde; phenol-furfural, urea-formaldehyde; melamine-formaldehyde; polycarbonates; and other amino, phenolic, alkyd, melamine, polyester and urea resins.

The plastisol composition 14 contains a blowing agent, such as is described in said U.S. Patents, as well as other additives such as catalysts, stabilizers, anti-oxidants, plasticizers, pigments, dyes, anti-foam agents, viscosity modifiers, etc. Typical formulations are to be found in said U.S. patents.

After the plastisol composition 14 containing the blowing agent is applied to the surface of the backing sheet material 12, it is then heated for a period of time of from about 1 minute to about 14 minutes in an oven or other suitable heating apparatus maintained at a temperature of from about 240° to about 450° F. whereby it gels and becomes relatively firm. The temperature and time of heating are interdependent and the higher the temperature, the shorter the time, and vice versa. The elevated temperature, however, is not high enough as to activate or to decompose the blowing agent in the plastisol composition as to cause blowing, foaming or expanding at this time. This heating also takes place in zone A.

THE PRINTING INK COMPOSITIONS

After the plastisol composition has been heated and dried, printing ink compositions may be applied to its surface. The printing ink compositions, if such are used, have substantially the same formulations as described and employed in said U.S. patents. Normally, they contain: resins, plasticizers, solvents, pigments, stabilizers, dyes, blow modifying agents such as inhibitors, retarders, suppressants, accelerators, promoters, kickers, etc. They are applied by standard or conventional printing processes and, of course, are of extreme thinness, only a fraction of a mil. Drying is accomplished by exposure to air or by conventional heating and drying procedures. Typical formulations are to be found in said U.S. patents, and should require no further discussion or description at this time. The printing may take place in zone B.

THE WEAR LAYER

A wear layer having an average thickness of from about 0.002 inch to about 0.025 inch may then be applied substantially uniformly over the surface of the printed, gelled plastisol composition 14. The wear layer is normally a clear, unpigmented resinous composition and its basic purpose is normally to give to the final resinous product improved wearing or in-use qualities. Many of the constituents of the previously described plastisol compositions are also present in the formulations of the wear layer, notably the polyvinyl chloride resin or other resins, plasticizers, stabilizers, solvents, viscosity modifiers, color stabilizers, etc., but other constituents such as the blowing agents, the pigments and dyes, etc., are normally omitted. Typical formulations for wear layer compositions are to be found in said U.S. Patents.

The backing sheet material 12 and the potentially foamable plastisol resinous composition 14, and the printing ink composition and the wear layer, if they are present, are thus prepared and processed by any or by all of the operations involving coating, heating, gelling, printing, saturating, drying, etc., as are described and illustrated in said U.S. patents. Such operations may take place in zone B.

THE BLOWING OPERATION

It will suffice to say that potentially foamable plastisol resinous composition 14 on the backing sheet material 12 is ultimately carried on a conveyor (not shown) into and through an oven 16 or other suitably heated zone C wherein it is heated to an elevated temperature for a controlled period of time. The blowing agent is thus activated or decomposed to blow, foam, or expand the potentially foamable plastisol resinous composition 14 in the desired fashion and to the desired extent to form a freshly blown resinous product 10'. The level of the elevated temperature and the length of time of exposure to the heat are interdependent and will vary depending upon many factors, principally the nature of the blowing agent and its activation or decomposition temperature and may be as low as about 220° F. or as high as about 490° F. and it is within such a temperature range that the blown resinous composition 10' leaves the heated oven 16.

The degree to which the potentially foamable plastisol resinous composition blows, foams, or expands is termed the "blow ratio" which basically indicates the increase in volume of the resinous composition during the blowing operation. Normally, the blow ratio is in the range of from about 2:1 to about 6:1, or even higher, but preferably is in the range of from about 2.5:1 to about 4:1. The blow ratio will depend upon the temperature and time of heating, the nature and concentration of the blowing agent, etc.

The freshly blown resinous product 10' is still relatively soft, plastic, and moldable at the elevated temperature, say, from about 220° F. to about 490° F. at which it exits from the heated blowing oven 16 and will remain in such a relatively soft, plastic, and moldable condition until it cools to room or ambient temperature and hardens. It is during this soft, plastic, and moldable period that the principles of the present invention are applicable.

As the freshly blown resinous product 10' leaves the exit end of the heated blowing oven 16, it is placed on and is carried forward for prompt further processing on an endless belt or other equivalent conveyor (not shown) of a conventional or standard type, the specific nature of which is not critical.

THE EMBOSSING OF THE FRESHLY BLOWN RESINOUS PRODUCT

Immediately adjacent the exit end of the heated blowing oven 16, there is positioned a length of a previously blown, chemically embossed, hardened, resinous product 20 which, as shown in the FIGURE is in the form of an endless movable belt trained around and driven by a pair of rotatable rolls 22 and 24, rotating on shafts 26 and 28. Normally, roll 22 and shaft 26 will supply the driving energy. Roll 24 is so positioned that the movable endless belt 20 is preferably merely a matter of inches from the exit end of the heated blowing oven 16.

The interval of time which elapses from the moment that the freshly blown resinous product 10' makes its exit from the heated blowing oven 16 and makes its entrance into the nip of a pair of pressure-applying rolls 30 and 32 to be embossed thereat by the previously blown, chemically embossed resinous belt 20 is important.

Naturally, the shorter this interval of elapsed time is, the more successful is the embossing operation and the more sharply defined is the decorative and textured design. When specific conditions exist, such as the use in the plastisol composition of a blowing agent having an activation or decomposition temperature as low as 220° F. (such as $N,N'$-dimethyl-$N,N'$-dinitrosoterephthalamide, for example), along with a relatively thin, freshly blown resinous product which would tend to cool more quickly from the 220° F. temperature and thus lose its soft, plastic, or moldable characteristics more quickly, the interval of elapsed time should be less than about 10 seconds.

However, if the plastisol composition contains a blowing agent having an activation or decomposition temperature as high as about 480° F. (such as barium azodicarboxylate, for example) is used along with a relatively thick freshly blown resinous product which would tend to cool more slowly from that 480° F. temperature and thus lose its soft, plastic, or moldable characteristics more slowly, the interval of elapsed time may be increased to as much as 1 minute.

The essential factor is that the freshly blown resinous product 10' not be allowed to cool to ambient or room temperature to harden but be soft, plastic, or moldable at the moment it enters the nip of the pressure applying rolls. Such is obtained by keeping the interval of elapsed time as short as possible under the existing conditions.

The term "previously blown" is used primarily to indicate that the resinous product was blown at some time in the past at an elevated temperature and that it was cooled from that elevated temperature to ambient or room temperature and consequently hardened during the cooling operation. In other words, it is no longer "freshly blown."

THE PREVIOUSLY BLOWN, CHEMICALLY EMBOSSED RESINOUS PRODUCT

The previously blown, chemically embossed resinous product is a typical finished, hardened, firm, commercial product such as is made by the chemical embossing techniques described and illustrated in said U.S. patents. It is similar in substantially all respects to such prior art products, except for a few relatively minor changes, as described hereinafter.

THE BACKING SHEET MATERIAL

The backing sheet material used in the manufacture of the previously blown, chemically embossed resinous endless belt 20 is selected from the same group of materials and specifications such as described previously with respect to the backing sheet material 12 used in the manufacture of the freshly blown resinous product 10'.

THE PREVIOUSLY BLOWN PORTION

The previously blown resinous portion of the chemically embossed resinous endless belt 20 is selected from the same group of chemical materials and specifications such as described previously with respect to the resinous plastisol composition 14 used in the manufacture of the freshly blown resinous product 10'. Normally, the thickness of the layer laid down is in the range of from about 0.003 inch to about 0.030 inch, as applied and still wet, prior to the previous blowing operation.

THE BLOW MODIFYING PRINTING INK COMPOSITION

The blow modifying printing ink composition used in the manufacture of the previously blown, chemically embossed, resinous endless belt 20 contains the same basic constituents as listed herein previously in the manufacture of the freshly blown resinous product 10'. In view of the specific purpose intended for the resinous endless belt, the conditions of the previous embossing operation are such that the blowing operation preferably achieves a more sharply defined embossed decorative or textured construction.

THE WEAR LAYER

In view of the subsequent intended purpose of the previously blown resinous endless belt 20, it is not essential that a top clear coating or wear layer be applied to the surface of the previously blown, chemically embossed resinous endless belt. Its presence in the subsequent use, according to the present invention, is not always required and, in fact, in some cases, its absence has been found to be beneficial and advantageous. The thickness of the wear layer, if present, therefore ranges from nothing, or as little as 0.002 inch to about 0.030 inch, depending on the particular circumstances and the proposed subsequent use of the previously blown, chemically embossed resinous product.

THE EMBOSSING SURFACE

The previously blown, chemically embossed resinous endless belt 20 has an embossed surface created by the chemical embossing techniques of said U.S. patents and will be referred to hereinafter at times as the "embossing surface." The depth and sharpness of design and texture of the embossing surface is at least as sharply defined or preferably more sharply defined as that obtained by the chemical embossing techniques of said U.S. patents.

Also, the "reversed" relationship of the design on the embossing surface to the design on the surface to be embossed must be kept in mind. Those lines and areas which are engraved or sunk into the surface of the embossing surface will ultimately appear in relief or raised above the surface of the embossed resinous product, and vice versa.

THE RELEASE COATING COMPOSITION

A standard or conventional release agent coating composition is applied substantially uniformly to the surface of the embossing surface for a purpose which will become clear from a further reading of this specification. Silicone polymeric materials are preferred as the release coatings and may be sprayed, brushed, padded, or otherwise applied in any desired fashion and to any desired thickness. Other suitable release agents applicable for use in the present invention may be applied in the same way and include: fluorocarbon plastic materials, such as polytetrafluoroethylene PTFE, fluorinated ethylene propylene FEP, etc.; natural and manufactured waxes; metallic salts of fatty acids; such as zinc stearate; soaps; polyvinyl alcohol; polyamides; polyethylene; polysiloxanes; "Quilon" Werner type chromium complexes in isopropanol; mica, talc; etc.

These release agents are applied substantially uniformly in standard or conventional amounts in order to provide desired anti-stick, anti-block, low adhesion release properties and characteristics to the embossing surface of the previously blown, chemically embossed resinous product 20.

These release agent coatings may be applied before the previous blowing operation, or after the previous blowing operation, as desired, or as required by the chemical and physical nature of the release agent and whether or not it would be harmed or undesirably changed by the elevated temperature of the blowing operation.

THE ROTATABLE PRESSURE-APPLYING ROLLS

The previously blown, chemically embossed resinous endless belt 20 normally has substantially the same width as the freshly blown resinous product 10' which leaves the blowing oven 16 in a relatively soft, plastic, and moldable condition. The endless belt 20 with its embossing surface facing downwardly is adapted to be placed directly on top of the freshly blown resinous product 10' in generally edge-to-edge relationship, substantially immediately after the freshly blown resinous product exits from the blowing oven 16. Some delay may, of course, be tolerated but is not advisable. In any event, the surface of the freshly blown resinous product 10' must not have cooled or hardened; it must still be hot and must still be soft, plastic, and moldable.

The two sheet materials, that is, the embossing surface 20 and the surface 10' to be embossed are moved onwardly uniformly together in unison for a short length and then pass between the nip of a pair of pressure-applying rolls 30 and 32 rotatably mounted on shafts 34 and 36, respectively. The rolls 30 and 32 are preferably steel, at least one of them being rubber coated to provide resilience. Suitable tension control devices are also provided.

The two rotatable pressure-applying rolls 30 and 32 are adjustably mounted in the vertical direction with respect to each other and are adapted to apply a controlled constant pressure to the sheet materials passing through their nip. In this way, the design or texture of the embossing surface is transferred to the soft, plastic, and moldable surface of the freshly blown resinous product 10'. The depth of the embossing is controlled by conventional means.

Having passed through the nip of the two pressure-applying rolls 30 and 32 the freshly blown and now embossed resinous product 10" moves onwardly to the left, as viewed in the FIGURE, gradually cooling as it does so and gradually hardening at the same time. It is then carried onwardly to be further processed or held in storage for further use.

The previously blown, chemically embossed resinous endless belt 20 is directed up and around the far end rotatable roll 22 and is guided back to the near end rotatable roll 24 to continue the cyclic arrangement of the continuous embossing process. The length of the endless belt 20 may be long or short, as desired, or as controlled by the needs of the particular situation.

The present invention will be described further by reference to the following examples wherein therein there are disclosed preferred embodiments of the present invention. However, it is to be appreciated that such examples are merely illustrative and are not to be construed as limitative of the broader aspects of the present invention concept.

EXAMPLE I

The method generally illustrated in the FIGURE is carried out substantially as follows: the backing sheet material is a 0.030 inch thick felt sheet of matted asbestos fibers. The potentially foamable plastisol coating composition which is applied substantially uniformly to the surface of the backing sheet material has an average thickness of about 0.015 inch, as applied and still wet and prior to blowing and expanding, and has the following composition by weight:

|  | Parts |
| --- | --- |
| Polyvinyl chloride, dispersion grade, specific viscosity 0.60 | 50 |
| Polyvinyl chloride, dispersion grade, specific viscosity 0.40 | 50 |
| Butyl benzyl phthalate plasticizer | 25 |
| Di-(2-ethylhexyl) phthalate plasticizer | 45 |
| Titanium dioxide pigment | 7 |
| Azodicarbonamide blowing agent | 3 |
| V. M. & P. Naphtha, boiling range 190 – 275° F. | 5 |

The potentially foamable plastisol coating composition is gelled to a relatively firm condition in an oven maintained at an elevated temperature of about 300° F. The length of time of exposure is about 3 minutes. This elevated temperature and period of time is sufficient to firm and gel the plastisol but is insufficient to activate or decompose the blowing agent to cause blowing, foaming, or expanding of the plastisol coating composition.

The desired patterned design is then printed on the surface of the cooled gelled plastisol and drying takes place at room temperature.

The printing ink composition has the following formulation by weight:

| | Parts |
|---|---|
| Polyvinyl chloride | 12.1 |
| Tricresyl phosphate | 6.5 |
| Methyl ethyl ketone | 81.4 |
| Pigment | 15.0 |

A wear layer or top clear coating having a thickness of about 0.010 inch is then applied substantially uniformly to the surface of the printed, gelled plastisol. The wear layer has the same general formulation as the plastisol coating composition with the exception that the titanium dioxide pigment and the azodicarbonamide blowing agent are omitted.

The printed, gelled plastisol with the wear layer thereon is then carried forwardly into a blowing oven maintained at an elevated temperature of about 390° F. wherein it is blown and expanded.

As the freshly blown printed plastisol exits from the heated blowing oven, it is still in a relatively soft, plastic, and moldable condition. It is immediately placed on a conveyor and is promptly forwarded for further processing. Specifically, it is still in condition for mechanical or pressure embossing according to the principles of the present invention.

The previously blown, chemically embossed resinous endless belt comprises a 0.030 inch thick backing sheet material of matted asbestos fibers upon which is a previously blown, chemically embossed resinous composition derived from a potentially foamable plastisol coating composition having the same formulation as that previously set forth in this example.

The embossing surface possesses the patterned design and texture created by the previous blowing, foaming, and expanding procedures of the chemical embossing techniques of the hereinmentioned U.S. patents.

A wear layer having a thickness of about 0.010 inch is also present and has the following composition by weight:

| | Parts |
|---|---|
| Polyvinyl chloride, dispersion grade, specific viscosity 0.50 | 100 |
| Dioctyl phthalate plasticizer | 17.0 |
| Tricresyl phosphate plasticizer | 8.5 |
| Epoxidized soya oil | 8.5 |
| Stabilizer | 2.0 |
| V. M. & P. Naphtha, boiling range 190 – 275° F. | 18.0 |

A release agent coating is also present and comprises a silicone polymeric material which is sprayed on the surface of the wear layer.

The total thickness of the previously blown, chemically embossed resinous endless belt varies from one specific point to the next, depending upon the depth (or elevation) of the embossed or textured design at that particular point, but has an overall average thickness in the range of about 0.087 inch.

The previously blown, chemically embossed resinous endless belt is trained over a pair of rotatable rolls, as illustrated in the FIGURE. The surface linear speed of the endless belt is coordinated to and is maintained equal to the surface linear speed of the freshly blown resinous product as its exits from the heated blowing oven and is placed on a conveyor which also has the same surface linear speed.

The embossing surface of the previously blown, chemically embossed resinous endless belt is on the lower and outer surface of its lower reach and is quickly placed on top and in register with the surface of the freshly blown resinous product while it is still relatively soft, plastic and moldable and before it has had sufficient time to cool to ambient or room temperature and harden. These two surfaces are substantially immediately passed through the nip of a pair of rotating, pressure-applying embossing rolls and the freshly blown resinous product is suitably embossed by the embossing surface.

Subsequently, the freshly blown, and now suitable embossed resinous product, is separated from the embossing surface with a minimum of sticking or adhesion due to the presence of the surface coating of the release agent and is carried forwardly for cooling and/or further processing, as desired. The previously blown, chemically embossed resinous endless belt separates from the freshly blown, and now suitably embossed resinous product and moves upwardly and around the rear rotatable roll and is returned in continuous cyclic fashion for further re-use in the embossing process.

The freshly blown suitably embossed resinous product, when it has subsequently cooled to ambient temperatures, is found to be acceptably and permanently embossed. Harkness develops as the surface cools. The final product is acceptable commercially and finds acceptable use as a floor covering.

EXAMPLE II

The procedures of Example I are followed substantially as set forth therein with the exeption that the wear layer is omitted from the previously blown, chemically embossed resinous endless belt. The results are generally comparable to the results obtained in Example I.

EXAMPLE III

The procedures of Example I are followed substantially as set forth therein with the exception that the release coating is applied as a 4% solution of a polyvinyl alcohol polymer. The results are generally comparable to the results obtained in Example I.

EXAMPLE IV

The procedures of Example I are followed substantially as set forth therein with the exception that the release agent is a 6% duPont Quilon stearato chromic chloride isopropanol solution. See U.S. Pat. No. 2,273,040, issued Feb. 17, 1942. The results are generally comparable to the results obtained in Example I.

EXAMPLE V

The procedures of Example I are followed substantially as set forth therein with the exception that the freshly blown resinous product is permitted to travel a short distance before the previously blown, chemically embossed resinous endless belt is applied to its surface. A period of time of about 10 seconds thus elapses but the freshly blown resinous product is still sufficiently soft, plastic, and moldable as to be satisfactorily embossed by the previously blown, chemically embossed resinous endless belt. The results are generally comparable to the results obtained in Example I.

EXAMPLE VI

The procedures of Example V are followed substantially as set forth therein with the exception that the elapsed time between the exit of the freshly blown resinous product from the blowing oven and its entrance into the nip of the pressure-applying rotatable rolls is increased to 5 minutes. During that time, the freshly blown resinous product cools almost to ambient or room temperature. The embossing by the previously blown, chemically embossed resinous endless belt is not satisfactory. Inspection of the freshly blown resinous product indicates that it was not sufficiently soft, plastic, or moldable at the time that the embossing thereof is attempted.

EXAMPLE VII

The procedures of Example I are followed substantially as set forth therein with the exception that the printing ink composition also contains 20 parts be weight of trimellitic anhydride, a known blow modifier. When exposed to the blowing temperature of about 390° F., the trimellitic anhydride modifies the blowing or foaming of the plastisol composition accordingly, so that the final product is textured as a result of the differential blowing or foaming due to the blow modifier, as well as the embossing due to the mechanical pressure action of the embossing surface of the endless belt. This, of course, is a different effect than that obtained in Example I wherein the textured effect is a result of only the mechanically embossed rolls and endless belt. The present Example yields a combined action and result.

Although several specific examples of the present inventive concept have been described, the same should not be construed as limiting the broader aspects of the invention nor should the specific features of such examples limit the scope of the invention. It is to be understood that any suitable changes, modifications, and variations and the use of equivalent features may be resorted to, without departing from the spirit and scope of the inventive concept.

What is claimed is:

1. A method of manufacturing an embossed resinous product having a textured surface which comprises: forming a potentially foamable resinous composition containing a blowing agent therein; heating said potentially foamable resinous composition for a sufficient period of time at an elevated temperature to activate said blowing agent to cause blowing of said potentially foamable resinous composition; and then, before the freshly blown resinous composition has cooled to ambient temperature and while it is still relatively soft, mechanically embossing said freshly blown resinous composition under sufficient pressure by applying to its surface a previously heated and blown, finished, hardened, chemically embossed resinous product having a suitably textured embossing surface; and cooling said freshly blown and now embossed resinous composition to yield and embossed resinous product having a textured surface.

2. A method as defined in claim 1 wherein said potentially foamable resinous composition containing a blowing agent is applied to the surface of a backing sheet material, prior to the heating and blowing thereof.

3. A method as defined in claim 1 wherein the heating and blowing of said potentially foamable resinous composition containing a blowing agent creates a substantially uniform blowing or expanding of said potentially foamable resinous composition.

4. A method as defined in claim 1 wherein said potentially foamable resinous composition containing a blowing agent is printed in a design or pattern with a printing ink composition containing a blow modifier, prior to the heating and blowing thereof in order to modify the uniformity of the blowing of said potentially foamable resinous composition in accordance with the printed design or pattern.

5. A method as defined in claim 1 wherein a resinous wear layer is applied to the surface of said previously blown, chemically embossed resinous product prior to its pressure application against the surface of said freshly blown resinous composition.

6. A method as defined in claim 1 wherein a release coating composition is applied to the surface of said previously blown, chemically embossed resinous product prior to its pressure application against the surface of said freshly blown resinous composition.

7. Apparatus for manufacturing an embossed resinous product having a textured surface which comprises: means for forming a potentially foamable resinous composition containing a blowing agent therein; means for heating said potentially foamable resinous composition for a sufficient period of time at an elevated temperature to activate the blowing agent to cause blowing of said potentially foamable resinous composition; means for mechanically embossing the freshly blown resinous composition under sufficient pressure to create texture on its surface comprising a previously heated and blown, finished, hardened, chemically embossed resinous product having a suitably textured embossing surface which is pressed against the surface of said freshly blown resinous composition; and means to cool said freshly blown and now embossed resinous composition to yield an embossed resinous product having a textured surface.

8. Apparatus as defined in claim 7 wherein said printing ink composition contains a blow modifier to modify the blowing of said potentially foamable resinous composition.

9. A method as defined in claim 1, wherein said potentially foamable resinous composition containing a blowing agent is printed with a printing ink composition, prior to the heating and blowing of said potentially foamable resinous composition.

10. Apparatus as defined in claim 7, wherein means is provided for printing said potentially foamable resinous composition containing a blowing agent with a printing ink composition, prior to the application of heat to cause blowing of said potentially foamable resinous composition.

11. Apparatus as defined in claim 7, wherein said means for mechanically embossing said freshly blown resinous composition is in the form of an endless belt.

* * * * *